United States Patent

Fukushima et al.

[15] 3,657,034

[45] Apr. 18, 1972

[54] METHOD OF PRODUCING SHEET MATERIALS SIMILAR TO LEATHER

[72] Inventors: Osamu Fukushima; Yoshitami Saito; Yuya Enomoto, all of Kurashiki, Japan

[73] Assignee: Kurashiki Rayon Co., Ltd., Kurashiki, Japan

[22] Filed: Sept. 10, 1969

[21] Appl. No.: 856,809

[30] Foreign Application Priority Data

| Sept. 20, 1968 | Japan | 43/68,655 |
| Oct. 31, 1968 | Japan | 43/79491 |
| Nov. 15, 1968 | Japan | 43/83947 |

[52] U.S. Cl..............................156/77, 156/230, 156/314
[51] Int. Cl...........................................................B32b 5/18
[58] Field of Search..............156/77, 78, 230, 314; 161/160, 161/161

[56] References Cited

UNITED STATES PATENTS

| 2,994,617 | 8/1961 | Proctor | 156/77 X |
| 3,284,274 | 11/1966 | Hulslander et al. | 156/77 X |
| 3,516,883 | 6/1970 | Harper | 156/77 |
| 3,520,765 | 7/1970 | Bateman | 156/77 X |

Primary Examiner—Carl D. Quarforth
Assistant Examiner—S. R. Hellman
Attorney—Stevens, Davis, Miller & Mosher

[57] ABSTRACT

Leather-like sheet materials having good moisture permeability and having appearance, texture, touch, drape and grain break similar to those of leather are produced by applying a layer of a solution of a polymer capable of being coagulated in a wet process onto a support; immersing the polymer solution applied to the support into a coagulation bath to coagulate the polymer solution layer into a porous structure; bonding a substratum to the surface of the resulting porous film which has not been in contact with the support and removing the support from the film.

7 Claims, No Drawings

METHOD OF PRODUCING SHEET MATERIALS SIMILAR TO LEATHER

The present invention relates to a method of producing sheet materials similar to leather.

It has been proposed to produce a leather-like sheet material by coating a layer of a polymer solution onto a substratum and coagulating the layer into a porous structure. The product thus obtained is moisture-permeable but is not similar to leather in appearance, texture, touch, drape and grain break.

It is an object of the present invention to provide a method of producing sheet materials having appearance, texture, touch, drape and grain break similar to those of leather and having an improved moisture permeability.

Broadly the present invention consists in a method which comprises;

a. applying a layer of a polymer solution onto a support,
b. immersing the polymer solution applied to the support into a coagulation bath to coagulate the polymer solution into a porous structure, and
c. bonding a substratum to the surface of the resulting porous film which has not been in contact with the support.

The sheet materials obtained in accordance with the method of the invention have a surface pattern similar to that of leather grain and have also a texture, touch, appearance and grain break similar to those of leather. They have low surface resilience and are hardly cut or damaged and even if they are damaged, the damages are not noticeable.

As the polymer, there may be used various polymers, which can be coagulated by a wet process, for example, polyesters, polyesteramides, polyamides, polyvinyl chloride, polyvinyl butyral, poly-α-methyl styrene, polyvinylidene chloride, polyurethane elastomer, polymers or copolymers of alkyl esters of acrylic acid and methacrylic acid, chlorinated polyethylene, chloro-sulfonated polyethylene, copolymer of butadiene and acrylonitrile, synthetic rubbers, alone or in admixture. It is preferred to use mainly elastomeric polymers. As the elastomeric polymers, various polymers may be used but polyurethane elastomers are the most preferable.

As the solvent, there may be used N,N-dimethylformamide, N,N-diethylformamide, N,N-dimethylacetamide, dioxane, γ-butyrolactone, N-methyl-2-pyrrolidone, ethyl acetate, phenol, chloroform, dimethylsulfoxide, tetrahydrofuran and tetramethylurea. Mixtures of these solvents with liquids, such as water ketones or alcohols which alone are often poor solvent for the polymer may also be used.

The polymer solution may contain various conventional additives, such as pigments, surface active agents, coagulation regulators, carriers, fillers, softening agents, water proofing agents, water repellents, light stabilizers and heat stabilizers. It is usually preferred in the method of the invention to use a polymer solution which has a temperature of 20° to 70° C, a viscosity of 1 to 500 poises at 30° C and a concentration of 5 to 35 percent by weight.

As supports, there may be used metal belts, films or sheets of various polymers, such as polyethylenes, polypropylenes, polyesters and polyamides.

As coagulation bath, non-solvents for the polymers and a mixture of a non-solvent with a solvent for the polymers may be used. In the method of the present invention it is preferred to use the coagulation bath which can coagulate the polymer solution in a high rate. As coagulation bath meeting such conditions, it is preferred to use the non-solvent alone or a mixture of a large amount, preferably more than 80 percent by weight of non-solvent with a small amount, preferably less than 20 percent by weight of solvent, for example, 95 percent by weight of non-solvent and 5 percent by weight of solvent. The temperature of the coagulation bath is preferred at 25° to 70° C.

As the non-solvent, water is the most preferred and methanol, ethylene glycol, glycerine, toluene, benzene may also be used.

As supports, there may be used metallic belts, films or sheet of polymeric material, such as polyethylene, polypropylene, polyesters, polyamides and polyvinyl alcohol, sheets obtained by laminating such films or sheets with woven or unwoven fabrics or paper and smooth surfaced sheet obtained by impregnating and coating woven or unwoven fabrics with solutions of the above polymers and then coagulating the polymer solutions.

In a preferred mode of carrying out the method of this invention, the step (a) is preceded by applying to the support a solution or dispersion, which may also contain polymer, of a coagulation regulator which is capable of making a film having a microporous structure, and if necessary, allowing it to dry. The coagulation regulator penetrates into the lower part of the layer of the solution and thus the lower part of the polymer solution which is in contact with the support can be coagulated into a compact structure.

In other preferred mode of carrying out the method of this invention, the step (a) is preceded by forming a continuous film of a high molecular substance on the support or by applying a concentrated solution of a high molecular substance to the support. In accordance with this procedure, a layer of concentrated solution of a high molecular substance is provided in contact with the support and thus the lower part of the film becomes a compact structure.

Suitable coagulation regulators include hydrocarbons, carboxylic acids, carboxylates, amides, nitriles, sulfonates, ureides or urethanes which contain an alkyl group having four to 50, preferably from 12 to 20, carbon atoms.

Coagulation regulators in which the alkyl group contains 12 or more carbon atoms, facilitate separation of the film from the support.

Examples of coagulation regulator include the following:

satufated or unsaturated hydrocarbons, such as octane, decane, eicosane, docosane, decene, octadecene including various isomers, 3,7,11-trimethyl-1,3,6,10-dodecatetracene and squalene;

carboxylic acids, such as adipic acid, sebacic acid and stearic acid;

carboxylates, such as octyl caproate, octadecyl laurate, octyl palimitate and methyl stearate;

nitriles, such as capronitrile, lauronitrile and stearonitrile;

amides, such as hexanoylamide, octanoylamide, lauric acid amide and stearic acid amide;

sulfonates, such as methyl octadecane sulfonate;

ureides, such as lauric acid monoureide, tridecenoic acid monoureide, palmitic acid monoureide, stearic acid monoureide and oleic monoureide; and urethanes of higher alcohols such as capryl, undecyl, lauryl, myristyl, pentadecyl, cetyl, stearyl, oleyl alcohol and decandiol, α-naphthyl urethane and phenyl urethane.

These compounds may be used alone or in admixture and suitably in the form of solution or dispersion containing from 0.01 to 20 percent, preferably from 0.01 to 5 percent of regulator.

As a solvent or dispersion medium for or coagulation regulator, there may be used an organic solvent suitable for each coagulation regulator, water. When the coated solution or dispersion of the coagulation regulator is dried and then a layer of polymer solution is applied thereto, solvents having a low boiling point, such as acetone, methyl ethyl ketone, methyl acetate, ethyl acetate, methyl alcohol, ethyl alcohol, benzene, toluene, tetrahydrofuran, are suitable, while when without drying the coated solution or dispersion of the coagulation regulator, a layer of polymer solution is applied thereto, it is preferable to use the same solvent as that for the polymer solution.

As high molecular substances previously applied to the support, there may be used various polymers which can be coagulated in a wet process alone or in admixture in the form of a solution or a dispersion, for example, polyamides, polycarbonates, polyacrylonitriles, polyacrylate, polyvinyl chloride, vinyl chloride — vinyl acetate copolymer, ethylene-vinyl acetate copolymer and polyurethane elastomer. Furthermore, as a particular means the precondensates of thermosetting high molecular weight substances, such as phenol resins and urea resin may also be used together with the above described substances.

If the film still adheres to the support after coagulation, it may be dried as it is. If the film is readily peeled off from the support after coagulation due to lack of affinity between the film and the support, it is important to dry the sheet under a biaxial tension since if the film is dried as it is, it shrinks and the surface becomes rough because of the porous structure of the film.

When it is intended to bond the film to the substratum, if the film adheres to the support, then the bonding is easier and therefore, it is advisable to remove the support from the film after the film has been bonded to the substratum. If the film naturally peels off from the support it is preferred that the film be slightly bonded to the support and then the substratum is bonded to the film, after which the support is peeled off from the film.

Various adhesives may be used for the bonding of the substratum to the film. In order to maintain the flexibility of the sheet material, it is preferred to use the adhesive capable of permitting the sheet material to retain the flexible texture after bonding. A two-part type polyurethane adhesive, a substantially linear one-part type polyurethane adhesive, a mixture of polyvinyl acetate and acrylate or a self cross-linkable nitrile-butadiene rubber are particularly suitable to use as adhesives.

It is preferred that the adhesives are used in the form of a solution or a dispersion which are suitably applied to spraying, brushing, rollercoating or bladecoating.

If the film is hot pressed prior to being bonded to the substratum, the density is raised and the pores can be inclined without influencing the substratum, so that a product more similar to leather can be obtained.

Furthermore, it is possible to remain various patterns on the film by providing patterns on the surface of the support by embossing the support previously and transferring the provided patterns to the coagulated film surface. Accordingly, in the film formed a dense surface in this manner, it is possible to omit a subsequent step for providing patterns on the film by embossing. However, it is an effective means in order to make the resulting sheet material similar to leather, to subject the film to a surface coloring and various leather-imitating works after the substratum is bonded to the film.

The following examples are given in illustration of this invention and are not intended as limitations thereof. All parts and percentages are by weight, unless otherwise specified.

EXAMPLE 1

A 16 percent solution of polyurethane elastomer in dimethylformamide (hereinafter referred to as DMF) having a viscosity of 16 poises at 30° C, containing 3 percent of carbon black based on the polyurethane as a pigment and maintained at 50° C was flowed onto a polyethylene sheet support under an atmosphere maintained at 50° C by means of a slit coat system to give an elastomer solution coating 0.8 mm thick, and then the support coated with the polyurethane elastomer solution was immersed into water maintained at 50° C for 15 minutes to coagulate the polyurethane elastomer solution. The coagulated polyurethane elastomer layer on the support was dried.

A mixture of 50 parts of nylon-6 and 50 parts of polystyrene was melt, extruded and drawn, and the drawn filaments were crimped and cut into staple fibers, which were formed into a non-woven fibrous mat, and the mat was needle-punched. The mat was impregnated with a 25 percent solution of polyurethane elastomer in DMF, immersed into a 40 percent aqueous solution of DMF at 40° C to coagulate the polyurethane elastomer solution, and then treated with hot toluene to extract and remove the polystyrene in the fiber. The surface of the mat thus treated was sliced to obtain a flexible substratum having a smooth surface.

The flexible substratum was bonded to a surface of the above-mentioned polyurethane elastomer film, which had not been in contact with the support, and then the support was peeled off from the film bonded to the substratum to obtain a leather-like sheet material.

EXAMPLE 2

A 16 percent solution of polyurethane elastomer in DMF having a viscosity of 18 poises at 45° C, containing 3 percent of titanium oxide based on the polyurethane elastomer as a pigment, was flowed onto a polyethylene sheet support under an atmosphere maintained at 40° C at a rate of 80 g/m$^2$ by means of a slit coat system. The support coated with the polyurethane elastomer solution was immersed into a 10 percent aqueous solution of DMF at 55° C for 12 minutes to coagulate the polyurethane elastomer solution. The coagulated polyurethane elastomer layer on the support was dried to obtain a film.

Then, the same flexible substratum as used in Example 1 was bonded to a surface of the film thus obtained, which had not been in contact with the support, and the support was peeled off. Then, the surface of the polyurethane elastomer layer peeled off from the support was embossed to obtain a leather-like sheet material.

EXAMPLE 3

A 5 percent aqueous emulsion of cellulose octadecylurethane was applied to a polyethylene terephthalate sheet having a thickness of 0.15 mm by means of a spray at a rate of 3 g/m$^2$, and dried. Then a 16 percent solution of polyurethane elastomer in DMF having a viscosity of 16 poises at 30° C containing 3 percent of carbon black based on the polyurethane elastomer as a pigment and maintained at 50° C, was flowed onto the above-mentioned dried cellulose octadecylurethane layer under an atmosphere maintained at 50° C by means of a slit coat system to give an elastomer solution coating 0.8 mm thick, and then, the resulting assembly was immersed into water at 50° C for 15 minutes to coagulate the polyurethane elastomer solution, and the polyurethane elastomer layer on the support was dried to obtain a film.

The flexible substratum as used in Example 1 was bonded to a surface of the above-mentioned dried film, which had not been in contact with the support, and then the support was peeled off to obtain a leather-like sheet material.

EXAMPLE 4

A 20 percent solution of polyurethane elastomer in a mixture of DMF and tetrahydrofuran (hereinafter referred to as THF) having a viscosity of 30 poises at 30° C was flowed onto a polypropylene sheet support having a thickness of 0.5 mm to give an elastomer solution coating 0.2 mm thick and dried. Then, a 16 percent solution of polyurethane elastomer in DMF having a viscosity of 16 poises at 30° C containing 5 percent of titanium white based on the polyurethane as a pigment and maintained at 50° C was flowed onto the above-mentioned dried polyurethane elastomer layer under an atmosphere at 50° C by means of a slit coat system to give an elastomer solution layer 0.8 mm thick and then left to stand for 3 minutes as it is. The resulting assembly was immersed into water at 40° C for 15 minutes to coagulate the polyurethane elastomer solution, and the support was peeled off from the coagulated layer.

The film obtained was dried while being drawn in two-axial directions of the film in a ratio of 2-3 percent of the dimension in the flowing, respectively. The surface of the film being in contact with the support was very dense and tough, and the porosity gradually becomes larger towards the inner direction.

The flexible substratum as used in Example 1 was bonded to a surface of the film, which had not been in contact with the support, to give a leather-like sheet material having a high surface toughness.

EXAMPLE 5

Onto the same support as used in Example 1 was flowed a 20 percent solution of polymethyl methacrylate in a mixture of DMF and THF in a ratio of 5 : 5 to give a solution layer 0.3 mm thick and dried. Then, a 14 percent solution of polyurethane elastomer in DMF having a viscosity of 10 poises at 30° C containing 5 percent of titanium white based on the polyurethane as a pigment and was kept at 50° C, was flowed on the above-mentioned dried polymethyl methacrylate layer under an atmosphere at 40° C to give a solution layer 0.8 mm thick and then left to stand for 5 minutes as it is. The resulting assembly was immersed into water at 40° C for 15 minutes to coagulate the polyurethane elastomer solution, and the support was peeled off from the coagulated layer. The thus obtained coagulated layer of film was dried while being drawn in two-axial directions in the same manner as described in Example 4.

When a substratum obtained in the same procedure as described in Example 1 was bonded to a surface of the above-mentioned dried film, which had not been in contacted with the support, a leather-like sheet material having an excellent grain break and texture was obtained. Moreover, when the resulting sheet material was sewed to manufacture a worked article, the seam did not appear noticeably in the worked article.

EXAMPLE 6

Onto the same support as used in Example 1 was flowed a 10 percent solution of polyvinyl chloride in a mixture of DMF and THF in ratio of 6 : 4 to give a solution layer 0.3 mm thick and dried. Then, the same 14 percent solution of polyurethane elastomer in DMF as used in Example 5 was flowed onto the above-mentioned dried polyvinyl chloride layer under an atmosphere at 40° C to give an elastomer solution layer 0.8 mm thick and then left to stand for 5 minutes as it is. The resulting assembly was immersed into water at 40° C for 15 minutes to coagulate the polyurethane elastomer solution, and the support was peeled off from the coagulated layer. The thus obtained coagulated layer film was dried while being drawn in two-axial direction in the same manner as described in Example 4.

When a substratum obtained in the same procedure as described in Example 1 was bonded to a surface of the above-mentioned dried film, which had not been in contact with the support, a leather-like sheet material having a large number of fine wrinkles on the surface and excellent surface toughness and texture was obtained. Moreover, when the resulting sheet material was sewed to manufacture a worked article, the seam did not appear noticeably in the worked article.

EXAMPLE 7

Onto a polyester sheet support having a thickness of 0.15 mm was flowed a 20 percent solution of a mixture of polyurethane elastomer and a precondensate of phenol resin in a ratio of 8 : 2 in DMF to give an elastomer solution layer 0.3 mm thick and dried. Then, the same 16 percent solution of polyurethane elastomer in DMF was flowed onto the above-mentioned dried polymer layer under an atmosphere at 50° C to give the solution layer 0.8 mm thick, and then left to stand for 5 minutes as it is. The resulting assembly was immersed into water at 50° C for 15 minutes to coagulate the polyurethane elastomer solution, and the coagulated polyurethane elastomer layer on the support was dried to form a film.

A substratum obtained in the same procedure as described in Example 1 was bonded to a surface of the above-mentioned polyurethane elastomer film, which had not been in contact with the support, and then the support was peeled off. The resulting sheet material was contacted with a roller having a surface temperature of 120° C to effect curing, whereby a leather-like sheet material having a smooth surface and a high surface rigidity was obtained.

EXAMPLE 8

Onto the same support as used in Example 4 was flowed a 10 percent solution of nylon-8 in methanol solution of calcium chloride to give the solution layer 0.15 mm thick, and dried. Then, the same 16 percent solution of polyurethane elastomer in DMF was flowed onto the above-mentioned dried nylon-8 layer under an atmosphere at 50° C to give the solution layer 0.8 mm thick, and then left to stand for 3 minutes as it is. The resulting assembly was immersed into water at 50° C for 15 minutes to coagulate the polyurethane elastomer solution, and the support was peeled off from the coagulated layer. The thus obtained coagulated layer film was dried while being drawn in two-axial directions in the same manner as described in Example 4.

When a substratum obtained in the same procedure as described in Example 1 was bonded to a surface of the above-mentioned dried film, which had not been in contact with the support, a leather-like sheet material having a highly elastic and tough surface was obtained.

EXAMPLE 9

Onto a polyethylene sheet support having a thickness of 0.7 mm was flowed a 40 percent solution of polyurethane elastomer in DMF having a viscosity of 500 poises at 30° C to give the solution layer 0.15 mm thick. Then, the same 16 percent solution of polyurethane elastomer in DMF as used in Example 4 was flowed onto the above-mentioned dried polyurethane elastomer layer under an atmosphere at 40° C to give the solution layer 0.8 mm thick, and then left to stand for 3 minutes as it is. The resulting assembly was immersed into water at 40° C for 15 minutes to coagulate the polyurethane elastomer solution, and the support was peeled off from the coagulated layer. The thus obtained coagulated layer film was dried while being drawn in two-axial directions in the same manner as described in Example 4.

When a substratum obtained in the same procedure as described in Example 1 was bonded to a surface of the above-mentioned dried film, which had not been in contact with the support, a leather-like sheet material having a high surface toughness and a smooth surface was obtained.

What is claimed is:

1. A method of producing a sheet material which comprises coating on a support a solution or dispersion of a coagulation regulator selected from the group consisting of hydrocarbon, carboxylic acid, carboxylate, amide, nitrile, sulphonate, ureide and urethane containing an alkyl group having from 12 to 20 carbon atoms and then applying a layer of a solution of a polymer onto the thus treated support, immersing the polymer solution applied to the support into a coagulation bath to coagulate the polymer solution layer into a porous structure, bonding a substrate to the surface of the resulting film which has not been in contact with the support and peeling off the support from the porous film.

2. A method as claimed in claim 1 in which the polymer is a polyurethane elastomer.

3. A method as claimed in claim 1 in which the polymer solution has a viscosity of from 1 to 500 poises at 30° C and concentration of 5 to 35 percent by weight.

4. A method as claimed in claim 1 in which the coagulation bath comprises a non-solvent for the polymer.

5. A method as claimed in claim 1 in which the coagulation bath comprises a mixture of at least 80 percent by weight of a non-solvent for the polymer and less than 20 percent by weight of a solvent for the polymer.

6. A method as claimed in claim 1 in which the dispersion or solution of coagulation regulator contains from 0.01 to 5 percent by weight of regulator.

7. A method as claimed in claim 1 in which there is first applied to the support a film of a high molecular weight substance or solution or dispersion thereof, instead of said solution or dispersion of a coagulator regulator.

\* \* \* \* \*